(12) United States Patent
Laitila et al.

(10) Patent No.: US 11,044,640 B2
(45) Date of Patent: Jun. 22, 2021

(54) UPLINK BEARER BINDING IN HANDOVER

(71) Applicant: Nokia Technologies Oy, Espoo (FI)

(72) Inventors: Matti Laitila, Oulu (FI); Benoist Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/573,176

(22) Filed: Sep. 17, 2019

(65) Prior Publication Data

US 2020/0100146 A1 Mar. 26, 2020

Related U.S. Application Data

(60) Provisional application No. 62/734,227, filed on Sep. 20, 2018.

(51) Int. Cl.
*H04W 36/00* (2009.01)
*H04W 36/38* (2009.01)
*H04W 36/08* (2009.01)
*H04W 84/04* (2009.01)

(52) U.S. Cl.
CPC ....... *H04W 36/0016* (2013.01); *H04W 36/08* (2013.01); *H04W 36/38* (2013.01); *H04W 84/042* (2013.01)

(58) Field of Classification Search
CPC . H04W 36/0016; H04W 36/08; H04W 36/38; H04W 84/042
See application file for complete search history.

(56) References Cited

U.S. PATENT DOCUMENTS

| 2018/0324631 | A1* | 11/2018 | Jheng | H04W 36/0022 |
| 2018/0368167 | A1* | 12/2018 | Kim | H04W 28/0278 |
| 2019/0349803 | A1* | 11/2019 | Byun | H04W 28/16 |
| 2019/0357075 | A1* | 11/2019 | Van Der Velde | H04W 28/0268 |
| 2019/0357093 | A1* | 11/2019 | Xu | H04W 36/08 |
| 2020/0008118 | A1* | 1/2020 | Han | H04W 36/08 |
| 2020/0112875 | A1* | 4/2020 | Peng | H04W 76/12 |

(Continued)

OTHER PUBLICATIONS

"3rd Generation Partnership Project; Technical Specification Group Radio Access Network; NR; NR and NG-RAN Overall Description; Stage 2 (Release 15)", 3GPP TS 38.300 V15.2.0, Jun. 2018, pp. 1-87.

(Continued)

*Primary Examiner* — Candal Elpenord
(74) *Attorney, Agent, or Firm* — Brake Hughes Bellermann LLP

(57) ABSTRACT

A technique of performing a handover within a 5G network include at least one of the following approaches. In one approach, a source gNB resets any mapping indicators from the forwarded SDAP PDUs, i.e., forwarded downlink data packets. Accordingly, subsequent uplink data packets will not be mapped according to the mapping tables of the source gNB. In another approach, the UE is configured to ignore mapping indicators of the forwarded downlink data packets. That is, in response to receiving a handover command message from the source gNB, the UE does not respond to updates of mapping tables from the source gNB. Again, subsequent uplink data packets will not be mapped according to the mapping tables of the source gNB.

14 Claims, 10 Drawing Sheets

(56) References Cited

U.S. PATENT DOCUMENTS

2020/0128452 A1\* 4/2020 Centonza .......... H04W 36/0044
2020/0245184 A1\* 7/2020 Jin ....................... H04W 28/02

OTHER PUBLICATIONS

"3rd Generation Partnership Project; Technical Specification Group Radio Access Network; E-UTRA and NR;Service Data Adaptation Protocol (SDAP) specification (Release 15)", 3GPP TS 37.324 V15.0.0, Jun. 2018, pp. 1-13.

Extended European Search Report received for corresponding European Patent Application No. 19197729.7, dated Nov. 28, 2019, 18 pages.

"TP on QoS and New Protocol Layer", 3GPP TSG-RAN WG2 #AH, Tdoc R2-1700659, Agenda : 3.2.1.2, Ericsson, Jan. 17-19, 2017, 3 pages.

"Data Forwarding with QoS Flow Relocation", 3GPP TSG-RAN3 Meeting #95bis, R3-171072, Agenda : 10.2, Huawei, Apr. 3-7, 2017, 6 pages.

"How to Toggle the RDI Bit", 3GPP TSG-RAN WG2 Meeting #101, R2-1803215, Agenda : 10.3.4.2, CMCC, Feb. 26-Mar. 2, 2018, 2 pages.

"Lossless Handover", 3GPP TSG-RAN WG2 Meeting #102, R2-1808325, Agenda : 1 0.3.4.3, CMCC, May 21-25, 2018, 2 pages.

"ROI Handling for Data Forwarding at Handover", 3GPP TSG-RAN WG2 Meeting #103bis, R2-1814220, Nokia, Oct. 8-12, 2018, 3 pages.

\* cited by examiner

UPLINK BEARER BINDING IN HANDOVER

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method comprises sending, by a source base station (BS), a handover request to a target BS; receiving, by the source BS, a handover request acknowledgement from the target BS; in response to receiving the handover request acknowledgement, identifying, by the source BS, a set of data packets to be forwarded to the target BS, the set of data packets including and a reflective mapping indicator; prior to forwarding the set of data packets, performing, by the source BS, a resetting operation on the reflective mapping indicator of each of the set of data packets to produce another set of data packets; and forwarding, by the source BS, the set of reset data packets to the target BS.

According to an example implementation, an apparatus includes at least one processor and at least one memory including computer program code, the at least one memory and the computer program code configured to, with the at least one processor, cause the apparatus at least to send a handover request to a target base station (BS); receive a handover request acknowledgement from the target BS; in response to receiving the handover request acknowledgement, identify a set of data packets to be forwarded to the target BS, the set of data packets including a reflective mapping indicator; prior to forwarding the set of data packets, perform a resetting operation on the reflective mapping indicator of the set of data packets to produce another set of data packets.

According to an example implementation, an apparatus includes means for sending a handover request to a target base station; means for receiving a handover request acknowledgement from the target base station; means for identifying a set of data packets to be forwarded to the target base station in response to receiving the handover request acknowledgement, the set of data packets including a reflective mapping indicator; means for performing a resetting operation on the reflective mapping indicator of the set of data packets to produce another set of data packets; and means for forwarding the other set of data packets to the target base station.

According to an example implementation, a computer program product includes a computer-readable storage medium and storing executable code that, when executed by at least one data processing apparatus, is configured to cause the at least one data processing apparatus to perform a method including sending a handover request to a target base station (BS); receiving a handover request acknowledgement from the target BS; in response to receiving the handover request acknowledgement, identifying a set of data packets to be forwarded to the target BS, the set of data packets including a reflective mapping indicator; prior to forwarding the set of data packets, performing a resetting operation on the reflective mapping indicator of each of the set of data packets to produce another set of data packets; and forwarding the other set of data packets to the target BS.

According to an example implementation, a method comprises receiving, by a user equipment (UE), a handover command message from a source base station (BS), the handover command message including information concerning a target BS; after receiving the handover command message, receiving, by the UE, a set of data packets from the target BS, a data packet of the set of data packets including a reflective mapping indicator, the reflective mapping indicator of the data packet of the set of data packets indicating that the user equipment uses the data packet for reflective mapping of a subsequent, uplink data packet; and performing, by the UE, a mapping operation to map at least one data packet of the set of data packets to a respective data radio bearer (DRB), the mapping operation being independent of a value of the reflective mapping indicator of the at least one data packet.

According to an example implementation, an apparatus includes one processor and at least one memory including computer program code, the at least one memory and the computer program code configured to, with the at least one processor, cause the apparatus at least to receive a handover command message from a source base station (BS), the handover command message including information concerning a target BS; after receiving the handover command message, receive a set of data packets from the target BS, a data packet of the set of data packets including a reflective mapping indicator, the reflective mapping indicator of a data packet of the set of data packets indicating that the user equipment uses the data packet for reflective mapping of a subsequent, uplink data packet; and perform a mapping operation to map at least one data packet of the set of data packets to a respective data radio bearer (DRB), the mapping operation being independent of a value of the respective reflective mapping indicator of the at least one data packet.

According to an example implementation, an apparatus includes means for receiving a handover command message from a source base station, the handover command message including information concerning a target base station; means for receiving a set of data packets from the target base station prior to forwarding the set of data packets, a data packet of the set of data packets including a reflective mapping indicator, the reflective mapping indicator of the data packet of the set of data packets indicating that the user equipment uses the data packet for reflective mapping of a subsequent, uplink data packet; and means for forwarding the other set of data packets to the target base station.

According to an example implementation, a computer program product includes a computer-readable storage medium and storing executable code that, when executed by at least one data processing apparatus, is configured to cause the at least one data processing apparatus to perform a method including receiving a handover command message from a source base station (BS), the handover command message including information concerning a target BS; after receiving the handover command message, receiving a set of data packets from the target BS, a data packet of the set of data packets including a reflective mapping indicator, the reflective mapping indicator of the data packet of the set of data packets indicating that the user equipment uses the data packet for reflective mapping of a subsequent, uplink data packet; and performing, by the UE, a mapping operation to map at least one data packet of the set of data packets to a respective data radio bearer (DRB), the mapping operation being independent of a value of the reflective mapping indicator of the at least one data packet.

According to an example implementation, a method comprises receiving, by a target BS, a handover (HO) request from a source BS; sending, by the target BS, a handover request acknowledgement to the target BS; after sending the HO request acknowledgement, receiving, by the source BS, a set of forwarded data packets to be forwarded to the target BS, each of the set of forwarded data packets including a reflective mapping indicator; and performing, by the target BS, a resetting operation on the reflective mapping indicator of each of the set of data packets to produce another set of data packets.

According to an example implementation, an apparatus includes one processor and at least one memory including computer program code, the at least one memory and the computer program code configured to, with the at least one processor, cause the apparatus at least to receive a handover (HO) request from a source BS; send a handover request acknowledgement to the target BS; after sending the HO request acknowledgement, receive a set of forwarded data packets to be forwarded to the target BS, each of the set of forwarded data packets including a reflective mapping indicator; and perform a resetting operation on the reflective mapping indicator of each of the set of data packets to produce another set of data packets.

According to an example implementation, an apparatus includes means for receiving a handover (HO) request from a source BS; means for sending a handover request acknowledgement to the target BS; means for receiving, after sending the HO request acknowledgement, a set of forwarded data packets to be forwarded to the target BS, each of the set of forwarded data packets including a reflective mapping indicator; and means for performing a resetting operation on the reflective mapping indicator of each of the set of data packets to produce another set of data packets.

According to an example implementation, a computer program product includes a computer-readable storage medium and storing executable code that, when executed by at least one data processing apparatus, is configured to cause the at least one data processing apparatus to perform a method including receiving a handover (HO) request from a source BS; sending a handover request acknowledgement to the target BS; after sending the HO request acknowledgement, receiving a set of forwarded data packets to be forwarded to the target BS, each of the set of forwarded data packets including a reflective mapping indicator; and performing a resetting operation on the reflective mapping indicator of each of the set of data packets to produce another set of data packets.

The details of one or more examples of implementations are set forth in the accompanying drawings and the description below. Other features will be apparent from the description and drawings, and from the claims.

DETAILED DESCRIPTION

Figure 1A:
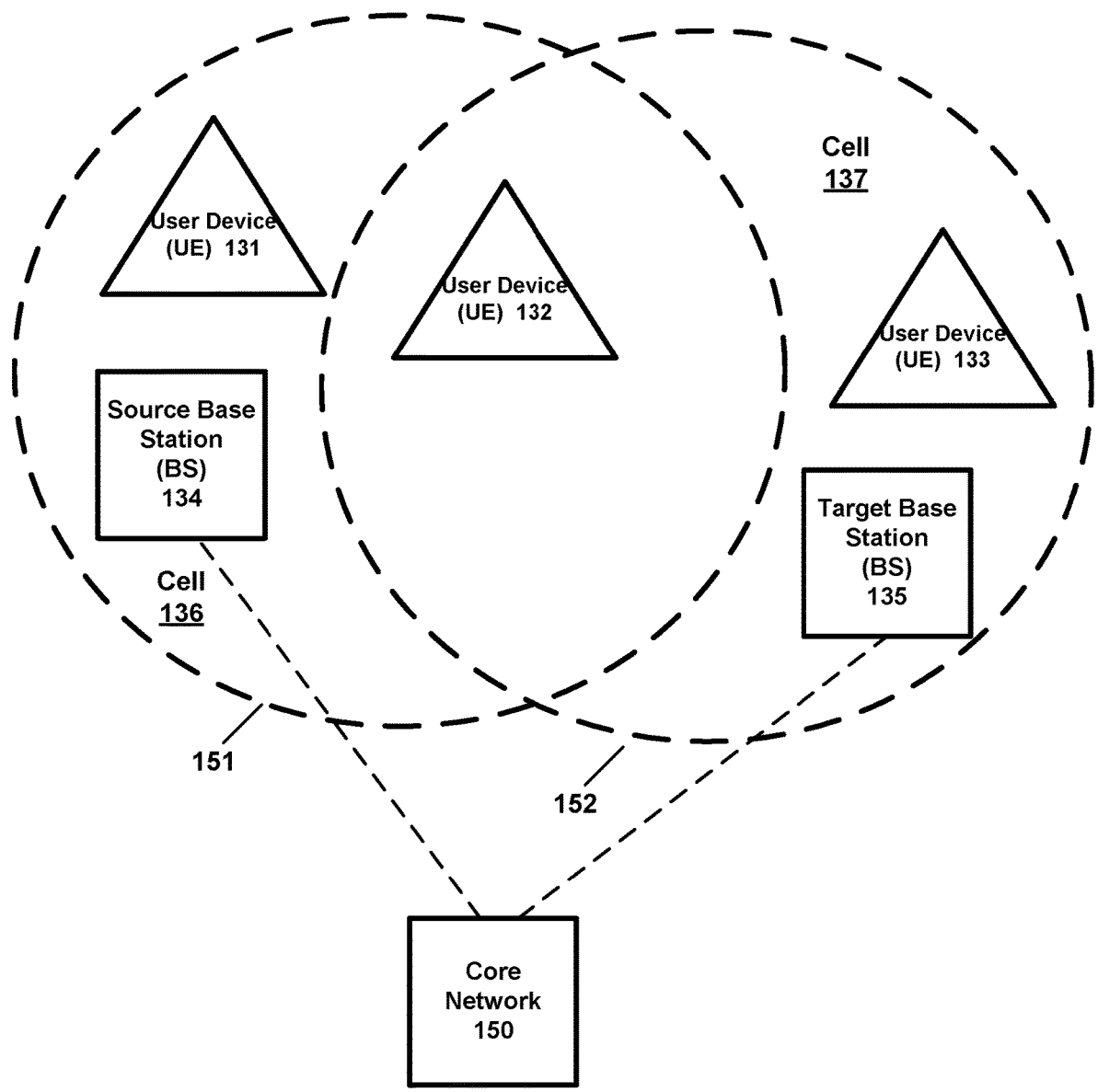
FIG. 1A is a block diagram of a wireless network according to an example implementation.

FIG. 1A is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with either of base stations (BS) 134 and 135, each of which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BSs (or APs) 134 and 135 provide wireless coverage within respective cells 136 and 137, including to user devices 131 and 132 from BS 134 and user device 133 from BS 135. Although only one or two user devices are shown as being connected or attached to BSs 134 and 135, any number of user devices may be provided. BS 134 and BS 135 are also connected to a core network 150 via respective interfaces 151 and 52. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

Figure 1B:
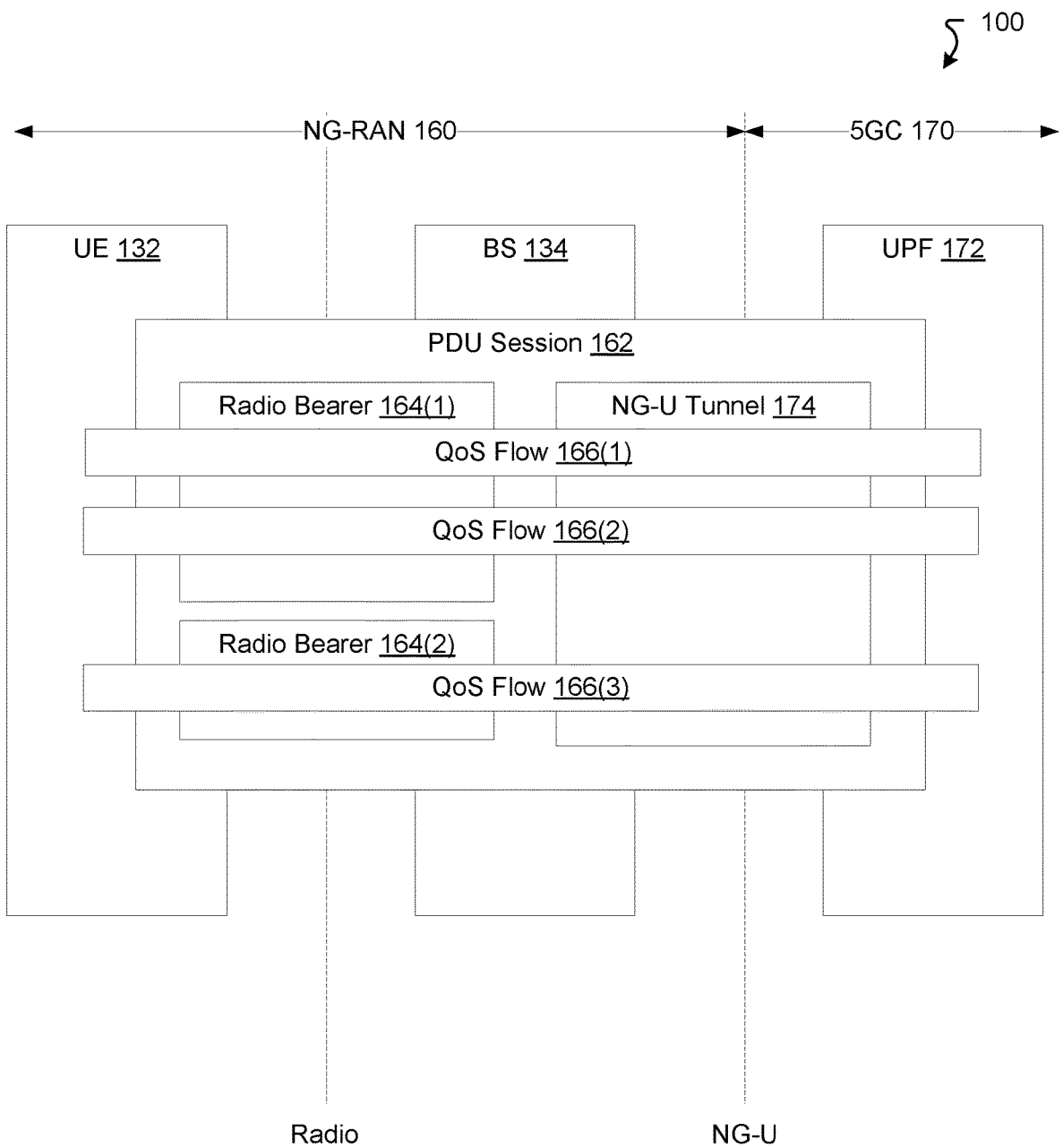
FIG. 1B is a diagram illustrating an example QoS architecture of the wireless network shown in FIG. 1A.

FIG. 1B is a diagram illustrating an example 5G QoS architecture 100 of the wireless network 130 shown in FIG. 1A. The 5G QoS architecture 100 is based on a flow-based QoS model, where unlike in LTE connected to EPC, 5G radio access network (RAN) can dynamically map end to end QoS flows into data radio bearers (DRBs).

In the QoS architecture 130, a next-generation RAN (NG-RAN) 160 includes the UE 132 and BS 134. The NG-RAN 160 is connected to a 5G core network (5GC) 170, which in turn includes a user plane function (UPF) 172. As shown in FIG. 1B, a protocol data unit (PDU) session 162 (i.e., a connection between a UE, e.g., UE 132 and a data network, e.g., 5GC 170) is defined within the architecture 100. Within the PDU session 162, there are DRBs 164(1) and 164(2), and a NG-U tunnel 174 defined. As also shown in FIG. 1B, there are two QoS flows 166(1) and 166(2) mapped to the DRB 164(1) and one QoS flow 166(3) mapped to the DRB 164(2).

The QoS architecture 100 in NG-RAN 160, both for NR (New Radio) connected to 5GC 170 and for E-UTRA (Evolved UMTS Terrestrial Radio Access) connected to 5GC 170, has the following features:

For each UE (e.g., UE 132), 5GC 170 establishes one or more PDU Sessions (e.g., PDU session 162).

For each UE, the NG-RAN 160 establishes at least one DRB (e.g., DRBs 164(1) and 164(2)) together with the PDU Session 162 and additional DRB(s) for QoS flow(s) of PDU session 162 can be subsequently configured.

The NG-RAN 160 maps packets belonging to different PDU sessions to different DRBs.

NAS level packet filters in the UE 132 and in the 5GC 170 associate UL and DL packets with QoS Flows.

AS-level mapping rules in the UE 132 and in the NG-RAN 160 associate UL and DL QoS Flows with DRBs.

The NG-RAN 160 and 5GC 170 ensure quality of service (e.g. reliability and target delay) by mapping packets to appropriate QoS Flows and DRBs. Hence there is a 2-step mapping of IP-flows (stream of data packets) to QoS flows (NAS) and from QoS flows to DRBs (Access Stratum (AS)).

The NG-RAN 160 can independently decide how QoS flows are mapped to DRBs. There are at least two ways to configure the UE side mapping to uplink mapping:

Reflective mapping: For each DRB, a UE monitors the QFI(s) of the downlink packets and applies the same mapping in the uplink. That is, for a DRB, the UE maps the uplink packets belonging to the QoS flows(s) corresponding to the QFI(s) and PDU Session observed in the downlink packets for that DRB. To enable this reflective mapping, the NG-RAN 160 marks downlink packets over Uu (i.e., a radio interface between the UE 132 and BS 134) with respective QFIs.

Explicit configuration: the NG-RAN 160 configures an UL QoS flow to DRB mapping by radio resource control (RRC).

Figure 1C:
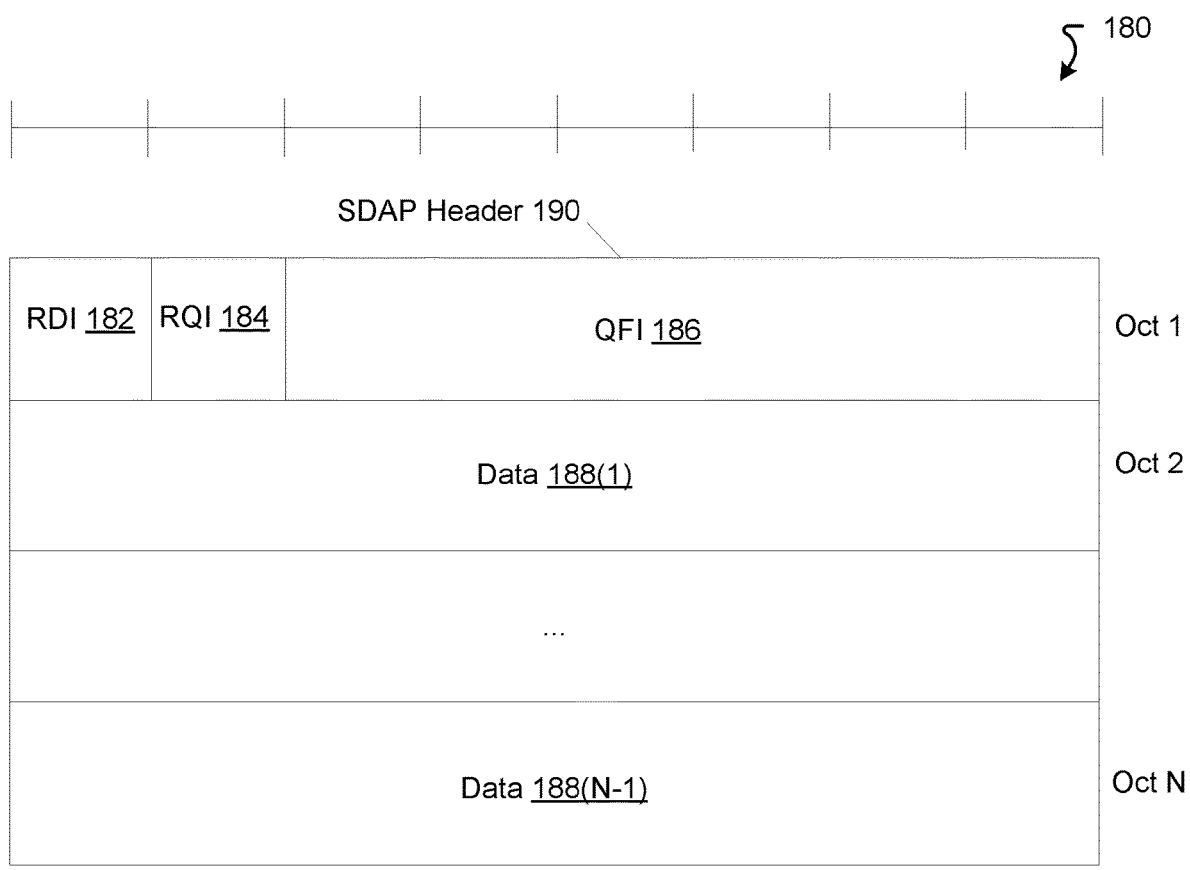
FIG. 1C is a diagram illustrating an example downlink data packet with PDU format with SDAP header.

The UE 132 always applies the latest update of the mapping rules regardless of whether it is performed via reflecting mapping or explicit configuration FIG. 1C is a diagram illustrating an example downlink data packet 180 with a PDU format, with a SDAP header 190. The downlink data packet 180 includes the SDAP header 190 and data portions 188(1), . . . , 188(N−1). The SDAP header 190 includes an RDI bit 182, an RQI portion 184, and a QFI portion 186.

The NG-RAN 160 controls the reflective mapping with the RDI bit 182 of the SDAP header 190. The RDI bit 182 indicates whether QoS flow to DRB mapping rule should be updated. The RDI bit 182 has values as follows:

TABLE 1

RDI Field

| Bit Value | Description |
|---|---|
| 0 | No action |
| 1 | To store QoS flow to DRB mapping rule. |

For example, if the RDI bit 182 is "0" then the UE 132 (SDAP layer) takes no action. If the RDI bit 182 is "1" then the UE 132 stores the mapping rule.

Further, the NG-RAN 160 supports lossless handovers (HOs) from a source gNB (e.g, BS 134) to a target gNB (e.g., BS 135). In conventional approaches to performing a HO within a 5G network, the target gNB must replicate the source gNB's DRBs for forwarded traffic. The forwarded packets are thus mapped according to the source gNB mapping table.

The above-described conventional approaches to performing a HO within a 5G network may cause the QoS flows to be mapped to DRBs according to the source gNB and not the target gNB as intended after HO. For example, the forwarded SDAP PDUs from the source gNB may have the reflective mapping RDI bits set. These RDI bit settings may alter the UL QoS flow mapping decisions of the target gNB. That is, a QoS flow may be mapped to the wrong DRB according to the target gNB after handover. This in turn may create problems for a user in terms of dropped calls, decreased bandwidth, and the like.

For example, suppose that a UE has two DRBs, DRB 1 and DRB 2, in the source gNB. Also, suppose that the mapping table for the source gNB is such that a QoS flow having an identifier QFI1 is mapped to DRB 1 and QoS flows having identifiers QFI 2 and QFI 3 are mapped to DRB 2. Table 2 below illustrates this mapping.

TABLE 2

QFi-DRB mapping table before handover.

| DRB 1 | DRB 2 |
|---|---|
| QFI 1 | QFI 2 |
|  | QFI 3 |

Suppose further that the target gNB has established a third DRB (DRB 3) and that its mapping table maps QFI3 into DRB 3 rather than DRB 2. Table 3 below illustrates this mapping.

TABLE 3

QFi-DRB mapping table after handover.

| DRB 1 | DRB 2 | DRB 3 |
|---|---|---|
| QFI 1 | QFI 2 | QFI 3 |

The source gNB may have packets in transmission buffer with RDI bit set to 1. When packets with the RDI bit set (e.g., to "1") are forwarded to the target gNB and subsequently sent to the UE, the UE may perform a reflective uplink mapping for a given QFI. This reflective uplink mapping may alter the new mapping configuration from the target gNB. If in the above example, the source gNB has a data packet in the transmission buffer of the DRB 2 having a QFI equal to QFI 3 and the RDI bit set to "1," that data packet would be forwarded to the target gNB through DRB 2 specific to the Xn tunnel. This data packet is then sent to the UE over DRB 2. As a result, the UE performs reflective mapping and maps uplink data packets having a QFI equal to QFI 3 back to DRB 2. Accordingly, the data packets are mapped according to the initial mapping table (Table 2), even though the target gNB uses a different mapping table (Table 3).

In contrast to the above-described conventional approaches to performing a HO within a 5G network, improved techniques of performing a HO within a 5G network include at least one of the following approaches. In one approach, the source gNB resets any mapping indicators from the forwarded SDAP PDUs, i.e., forwarded downlink data packets. For example, the source gNB may set the RDI bit of the SDAP header of each of the forwarded SDAP PDUs to "0" so that any change to the mapping as expressed by mapping tables between QFI and DRB is not stored by the UE. Accordingly, subsequent uplink data packets will not be mapped according to the mapping tables of the source gNB. In another approach, the UE is configured to ignore mapping indicators of the forwarded downlink data packets. That is, in response to receiving a handover command message from the source gNB, the UE does not respond to updates of mapping tables from the source gNB. Again, subsequent uplink data packets will not be mapped according to the mapping tables of the source gNB.

Advantageously, the QoS flows of uplink data packets are mapped to DRBs according to mapping tables from the target gNB rather than the source gNB. This in turn allows a user to maintain a good experience with the UE in terms of call quality, bandwidth, and the like.

Figure 2:
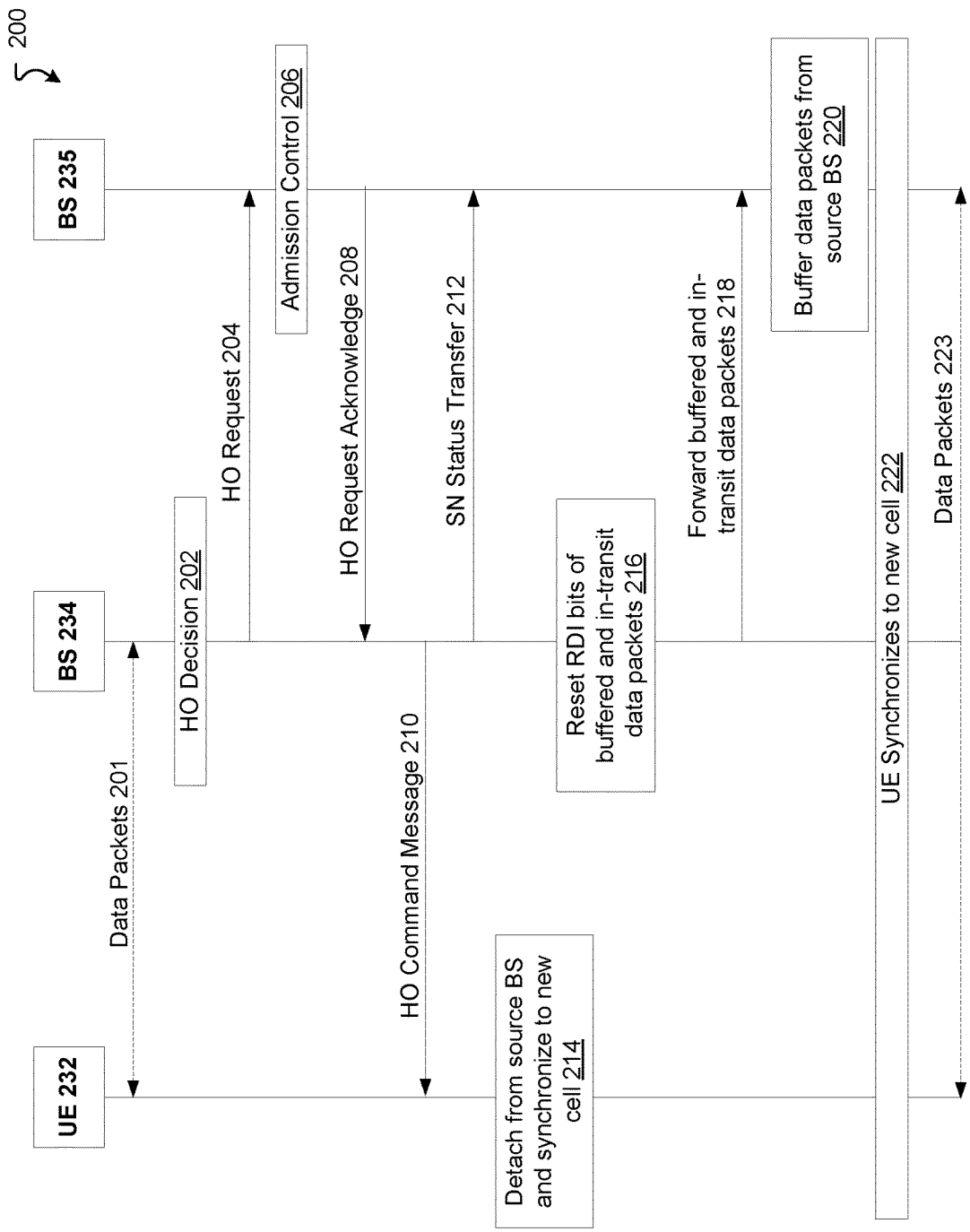
FIG. 2 is a sequence diagram illustrating a technique of binding an uplink data packet to a DRB according to an example implementation.

FIG. 2 is a diagram illustrating a technique of performing a HO within a 5G network according to an example implementation. At UE 232, BS 234 (source gNB) and BS 235 (target gNB) are in communication, as shown. It is understood that each of BS 134 and BS 135 are in communication with a core network (e.g., 5GC).

In this implementation of the improved technique of performing a HO, the BS 234 (re)sets RDI bits of the forwarded data packets to "0" before sending the packets to the target gNB. Thus, data packets do not trigger the UE 232 to perform reflective mapping. There are two types of packets that are forwarded:

Fresh packets arriving from the user plane function (UPF) through NG-U to BS 234 after the HO trigger. The BS 234 should set the RDI of these packets to "0." Packets may then be sent to another gNB and the BS 234 should not influence the DRB mapping on target BS (e.g., BS 235).

Packets that SDAP layer of the source gNB has already processed before the HO trigger. The RDI of these packets may have been set to "1" before the HO trigger, so the source gNB (e.g., BS 234) must reset the RDI to "0" if RDI was "1" before sending to a target gNB (e.g., BS 235) over the Xn tunnel.

In some implementations, the target gNB (BS 235) may reset the RDI of all forwarded packets to "0" after receiving them over the Xn interface.

Initially, at 201, only the UE 232 and the BS 234 are in communication and exchanging data packets. At 202, the BS 234 is triggered to initiate a HO to the BS 235. In some implementations, the BS 234 is triggered based on information regarding roaming and access restrictions which were provided either at connection establishment or at the last tracking area update. In some implementations, the BS 234 is triggered based on radio resource management (RRM) information.

At 204, the BS 234 issues a Handover Request message to the BS 235 passing a transparent radio resource control (RRC) container with necessary information to prepare the handover at the target side. The information includes at least the target cell ID, KgNB*, the C-RNTI of the UE 232 in the BS 234, RRM-configuration including UE inactive time, basic AS-configuration including antenna information and downlink carrier frequency, the current QoS flow to DRB mapping applied to the UE 232, the minimum system information from BS 234, the UE capabilities for different radio access technologies (RATs), PDU session related information, and can include the UE reported measurement information including beam-related information if available. The PDU session related information includes the slice information (if supported) and QoS flow level QoS profile(s).

At 206, the BS 235 performs admission control. Slice-aware admission control may be performed if slice information is sent to the BS 235. If the PDU sessions are associated with non-supported slices the BS 235 shall reject such PDU sessions.

At 208, the BS 235 prepares the HO with Layer 1 (e.g., PHY layer) and Layer 2 (e.g., MAC layer, RLC layer, PDCP layer) and sends a Handover Request Acknowledge to the BS 234. The Handover Request Acknowledge message includes a transparent container to be sent to the UE 232 as an RRC message to perform the HO. It is at this operation 208 where the target gNB (i.e., BS 235) mapping is defined, i.e., the target gNB provides an RRC configuration for the UE 232.

At 210, the BS 234 triggers the HO and sends the RRC Reconfiguration message containing the Handover Command message to the UE 232. The Handover Command message carries the information required to access the BS 235, which includes at least the target cell ID, the new cell radio network temporary identifier (C-RNTI), the target gNB security algorithm identifiers for the selected security algorithms, can include a set of dedicated random access channel (RACH) resources, the association between RACH resources and synchronization signal (SS) blocks, the association between RACH resources and UE-specific channel state information reference signal (CSI-RS) configuration(s), common RACH resources, and target cell system information blocks (SIBs), and the like.

The Handover Command message includes at least cell ID and all information required to access the target cell so that the UE can access the target cell without reading system information. For some cases, the information required for contention-based and contention-free random access can be included in the Handover Command message. The access information to the target cell may include beam specific information, if any.

Forwarded packets may be mapped according to source gNB (i.e., BS 234) table. "Forwarded" means the packets already in transit to the source gNB prior to or during handover. The forwarded data packets may cause the mapping to revert to the old mapping after handover, because the RDI bit in the packets is set according to the source gNB.

At 212, the BS 234 sends a sequence number (SN) Status Transfer message to the BS 235 to convey the uplink PDCP SN receiver status and the downlink PDCP SN transmitter status of E-UTRA Radio Access Bearers for which PDCP status preservation applies.

At 214, the UE 232 synchronizes to the new cell (e.g., cell 152 of FIG. 1) and detaches from the old cell (e.g., cell 151).

At 216, as part of the improved techniques of performing the HO, the BS 234 resets the RDI bits of the SDAP headers of the buffered and in-transit DL data packets. In some implementations, the resetting of the RDI bits includes changing a value of the RDI bit in the SDAP header of at least one downlink data packet to indicate that the mapping of that data packet to a DRB is based on a rule from the target BS rather than a rule from the source BS.

At 218, the BS 234 forwards the buffered and in-transit DL data packets to the BS 235.

At 220, the BS 235 places the forwarded data packets into a buffer.

At 222, the UE 232 synchronizes to the BS 235 and completes the RRC handover procedure by sending RRC Reconfiguration Complete message to the BS 235. The BS 235 and the UE 232 are now in communication and may exchange data packets. Further, the uplink data packets are mapped to DRBs according to the mapping tables of the BS 235.

Figure 3:
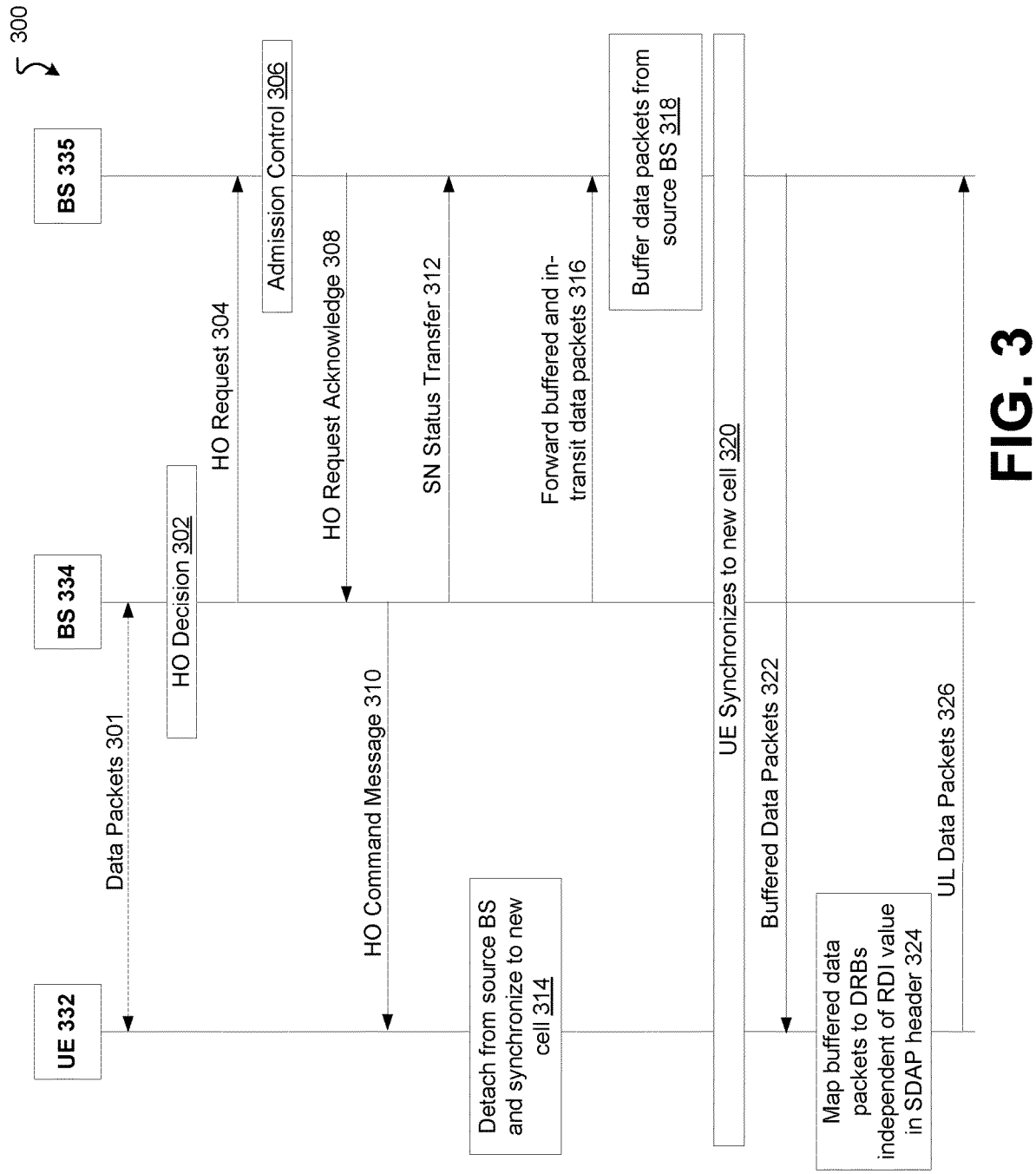
FIG. 3 is a sequence diagram illustrating a technique of binding an uplink data packet to a DRB according to another example implementation.

FIG. 3 is a diagram illustrating a technique of performing a HO within a 5G network according to another example implementation. At UE 332, BS 334 (source gNB) and BS 335 (target gNB) are in communication, as shown. It is understood that each of BS 334 and BS 335 are in communication with a core network (e.g., 5GC).

In the second solution UE ignores the RDI of all forwarded packets. Details of the second solution are shown with respect to FIG. 4.

Figure 4:
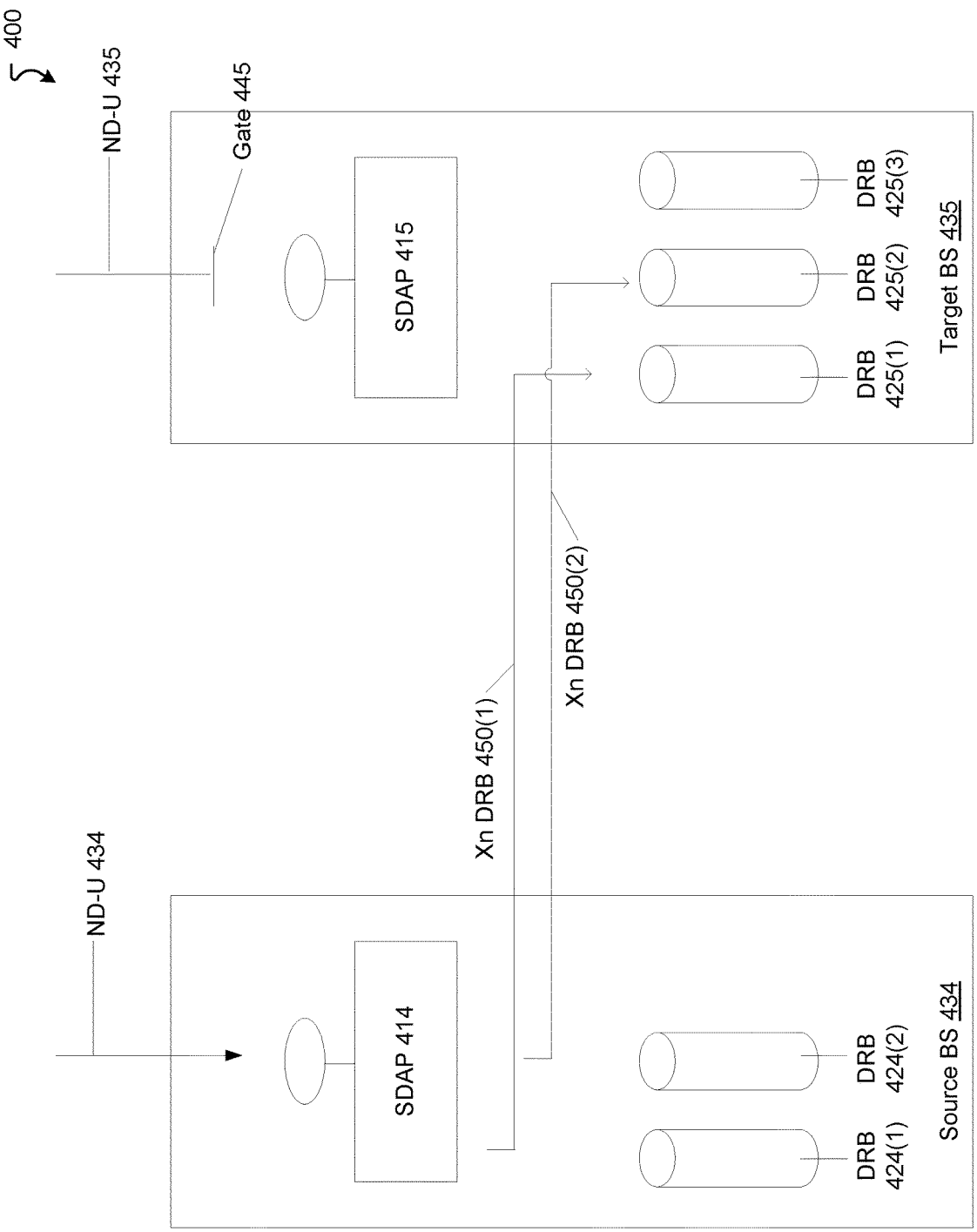
FIG. 4 is a diagram illustrating a network according to an example implementation.

FIG. 4 is a diagram illustrating a network 400 according to an example implementation, including data forwarding over the Xn interface in handover (HO). As illustrated in FIG. 4, the network 400 includes a source base station (BS) 434 and a target BS 435.

The source BS 434 includes a service adaptation access protocol (SDAP) layer 414, two data radio bearers (DRBs) 424(1) and 424(2), and an ND-U tunnel 464 over which data packets arrive from an application layer of a user plane function (UPF). The target BS 435 includes a SDAP layer 415, three data radio bearers (DRBs) 425(1), 425(2), and 424(3), an ND-U tunnel 465 over which data packets arrive from an application layer of a user plane function (UPF), and a gate 445. It is noted that new packets go through the gate 445 once downlink forwarded packets have been sent to a UE. The data packets are forwarded between the BS 434 and the BS 435 over the XN interfaces 450(1) and 450(2), corresponding to DRB 425(1) and DRB 425(2), respectively.

DRB 425(1) and DRB 425(2) were configured for the UE before HO by the BS 434. The BS 435 established a DRB 425(3) in HO signaling, but it may keep the original DRBs 424(1) and 424(2) until forwarded packets are sent as forwarded packets may be mapped in the same manner as in the BS 434.

Nevertheless, in some implementations, the UE cannot ignore RDIs of the data packets mapped to the original DRBs 424(1) and 424(2) for all time since the BS 435 may keep those data packets and eventually map QoS flows with reflective mapping into those DRBs, i.e., DRBs 425(1) and 425(2). Along these lines, one may control when or how the UE ceases ignoring the RDIs of downlink data packets received from the original DRBs 424(1) and 424(2).

Timer. A timer can be based on a pre-configured value or, in some implementations, the timer may be configured by the BS 434 with HO command signaling. In some implementations, the BS 434 bases the timer on a data volume in transmission buffers.

Sequence number (SN). The BS 434 may indicate the highest SN of the buffered data packets to the UE. In some implementations, the BS 434 sets the RDI of all new data packets to 0 in order to effect such an indication.

Returning to FIG. 3, initially, at 301, only the UE 332 and the BS 334 are in communication and exchanging data packets. At 302, the BS 334 is triggered to initiate a HO to the BS 335. In some implementations, the BS 334 is triggered based on information regarding roaming and access restrictions which were provided either at connection establishment or at the last tracking area update. In some implementations, the BS 334 is triggered based on radio resource management (RRM) information.

At 304, the BS 334 initiates handover and issues a Handover Request message to the BS 335 over the Xn interface. The BS 334 passes a transparent radio resource control (RRC) container with necessary information to prepare the handover at the target side. The information includes at least the target cell ID, KgNB*, the C-RNTI of the UE 332 in the BS 334, RRM-configuration including UE inactive time, basic AS-configuration including antenna information and downlink carrier frequency, the current QoS flow to DRB mapping applied to the UE 332, the minimum system information from BS 334, the UE capabilities for different radio access technologies (RATs), PDU session related information, and can include the UE reported measurement information including beam-related information if available. The PDU session related information includes the slice information (if supported) and QoS flow level QoS profile(s).

At 306, the BS 335 performs admission control. Slice-aware admission control may be performed if slice information is sent to the BS 335. If the PDU sessions are associated with non-supported slices the BS 335 shall reject such PDU sessions.

At 308, the BS 335 prepares the HO with Layer 1 (e.g., PHY layer) and Layer 2 (e.g., MAC layer, RLC layer, PDCP layer) and sends a Handover Request Acknowledge to the BS 334. The Handover Request Acknowledge message includes a transparent container to be sent to the UE 332 as an RRC message to perform the HO. It is at this operation 208 where the target gNB (i.e., BS 235) mapping is defined, i.e., the target gNB provides an RRC configuration for the UE 232

At 310, the BS 334 triggers the HO and sends the RRC Reconfiguration message containing the Handover Command message to the UE 332. The Handover Command message carries the information required to access the BS 335, which includes at least the target cell ID, the new cell radio network temporary identifier (C-RNTI), the target gNB security algorithm identifiers for the selected security algorithms, can include a set of dedicated random access channel (RACH) resources, the association between RACH resources and synchronization signal (SS) blocks, the association between RACH resources and UE-specific channel state information reference signal (CSI-RS) configuration (s), common RACH resources, and target cell system information blocks (SIBs), and the like.

The Handover Command message includes at least cell ID and all information required to access the target cell so that the UE can access the target cell without reading system information. For some cases, the information required for contention-based and contention-free random access can be included in the Handover Command message. The access information to the target cell may include beam specific information, if any.

Forwarded packets may be mapped according to source gNB (i.e., BS 334) table. "Forwarded" means the packets already in transit to the source gNB prior to or during handover. The forwarded data packets may cause the mapping to revert to the old mapping after handover, because the RDI bit in the packets is set according to the source gNB.

At 312, the BS 334 sends a sequence number (SN) Status Transfer message to the BS 335 to convey the uplink PDCP SN receiver status and the downlink PDCP SN transmitter status of E-UTRA Radio Access Bearers for which PDCP status preservation applies.

At 314, the UE 332 synchronizes to the new cell (e.g., cell 152 of FIG. 1) and detaches from the old cell (e.g., cell 151).

At 316, the BS 334 forwards the buffered and in-transit DL data packets to the BS 335.

At 318, the BS 335 places the forwarded data packets into a buffer.

At 320, the UE 332 synchronizes to the BS 335 and completes the RRC handover procedure by sending RRC Reconfiguration Complete message to the BS 335. The BS 335 and the UE 332 are now in communication and may exchange data packets.

At 322, the BS 335 sends the buffered, downlink data packets to the UE 332.

At 324, as part of the improved techniques of performing the HO, the UE 332 reflectively maps uplink data packets to DRBs independent of the RDI bit value of the SDAP headers of the received downlink data packets. In some implementations, the mapping of the uplink data packets to DRBs without regard for the RDI bit values of the downlink data packets continues until a trigger is reached. That is, the RDI is a reflective QoS indicator. The UE does reflective mapping when RDI bit is set to 1. In some implementations, if RDI bit is not set, the UE does not update uplink packet mapping based on the downlink packets. Rather, the UE uses the mapping rules it already has.

In some implementations, the trigger involves a specified amount of time having elapsed. In some implementations, the specified amount of time is signaled by the core network. In some implementations, the specified amount of time is signaled in the Handover Command message. In some implementations, the specified amount of time is based on a data volume in transmission buffers (e.g., stored in the BS 335).

In some implementations, the trigger involves a threshold SN of the buffered data packets being reached. In some implementations, the threshold SN is signaled by the core network. In some implementations, the threshold SN is signaled in the Handover Command message.

At 326, the UE 332 sends the uplink data packets to the BS 335. These data packets are mapped to DRBs according to the mapping tables of the BS 335.

Example 1

Figure 5:
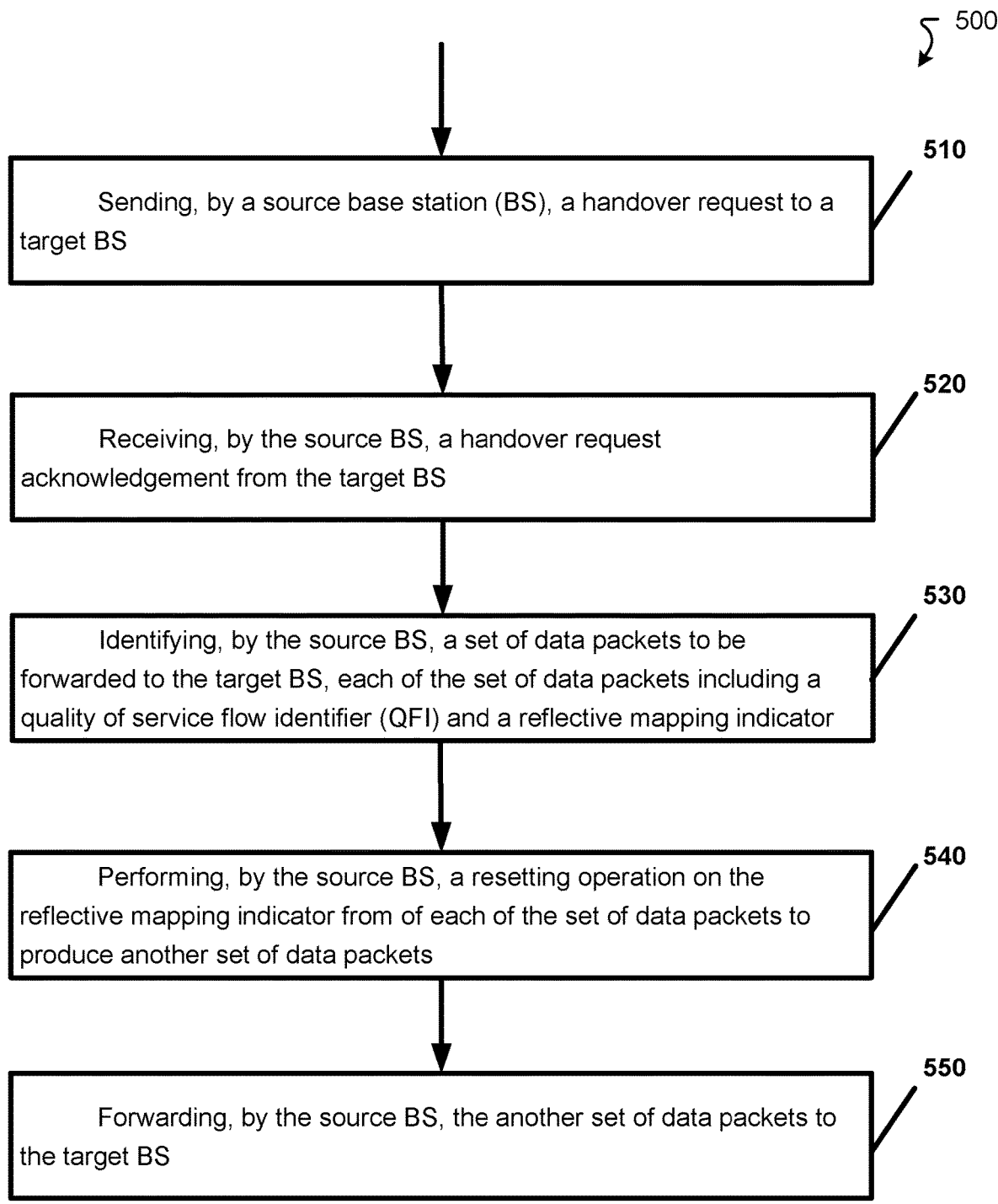
FIG. 5 is a flow chart illustrating operation of a source base station according to an example implementation.

FIG. 5 is a flow chart illustrating operation of a source base station (BS) according to an example implementation. Operation 510 includes sending, by a source BS, a handover (HO) request to a target BS. Operation 520 includes receiving, by the source BS, a handover request acknowledgement from the target BS. Operation 530 includes, in response to receiving the HO request acknowledgement, identifying, by the source BS, a set of data packets to be forwarded to the target BS, each of the set of data packets including a reflective mapping indicator. Operation 540 includes, prior to forwarding the set of data packets, performing, by the source BS, a resetting operation on the reflective mapping indicator of each of the set of data packets to produce another set of data packets. Operation 550 includes forwarding, by the source BS, the another set of data packets to the target BS.

Example 2

According to an example implementation of example 1, wherein each of the set of data packets includes a service data adaptation protocol (SDAP) header; and wherein the reflective mapping indicator includes a reflective mapping indication (RDI) bit in the SDAP header.

Example 3

According to an example implementation of example 2, wherein performing the resetting operation on the reflective mapping indicator of each of the set of data packets includes changing a value of the RDI bit in the SDAP header of a data packet of the set of data packets to indicate that the mapping of that data packet to a DRB is based on a rule from the target BS rather than a rule from the source BS.

Example 4

According to an example implementation of example 1, wherein the reflective mapping indicator of a data packet of the set of data packets indicates whether an uplink data packet is to be mapped to a data radio bearer based on an existing mapping rule.

Example 5

According to an example implementation of example 4, wherein the mapping rule includes a mapping table.

Example 6

According to an example implementation of example 4, wherein the other set of data packets has a reflective mapping indicator that indicates that the uplink data packet is to be mapped to the data radio bearer based on the existing mapping rule.

Example 7

Figure 6:
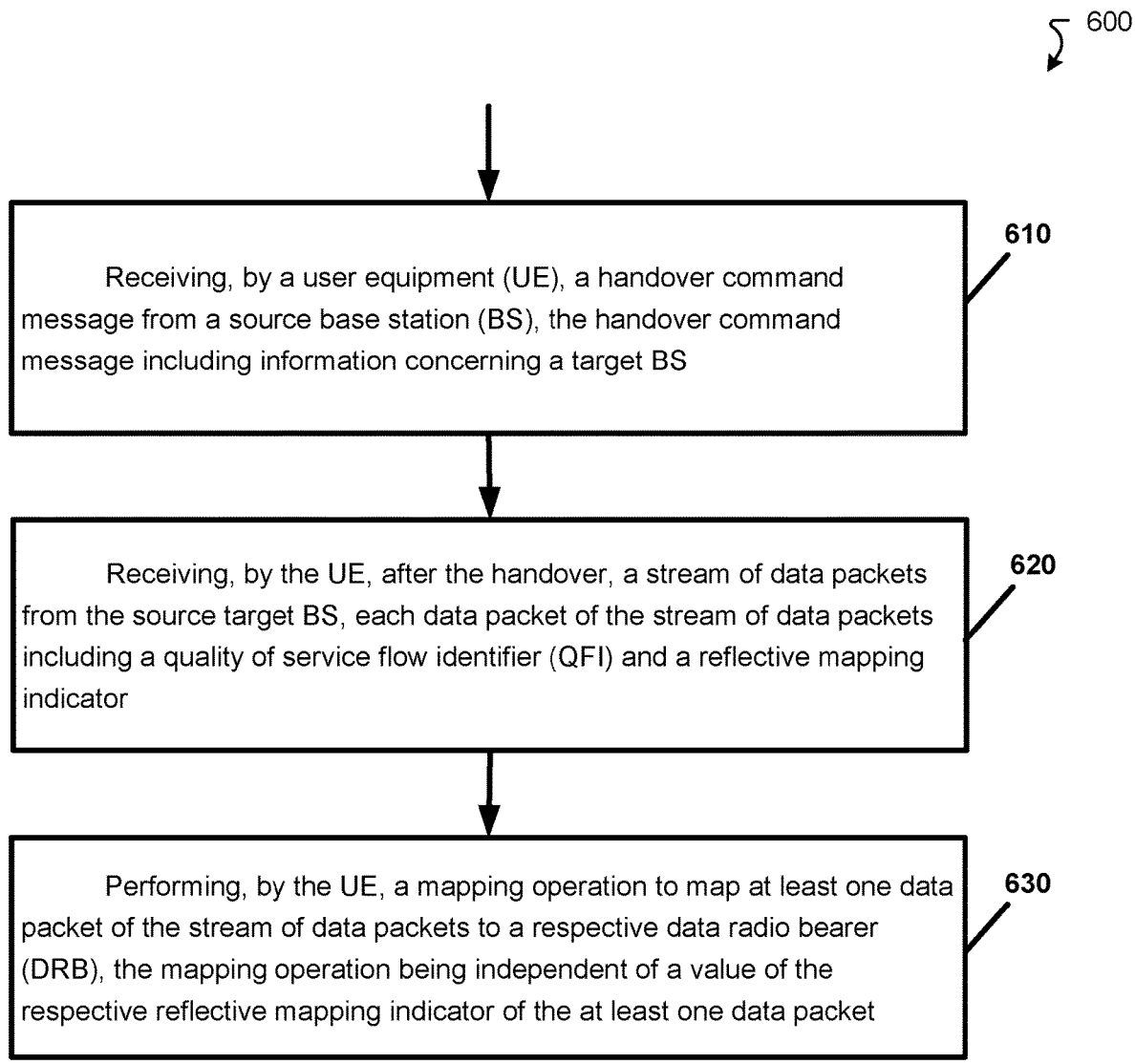
FIG. 6 is a flow chart illustrating operation of a user equipment according to an example implementation.

FIG. 6 is a flow chart illustrating operation of a user equipment (UE) according to another example implementation. Operation 610 includes receiving, by a user equipment (UE), a handover command message from a source base station (BS), the handover command message including information concerning a target BS. Operation 620 includes, after receiving the handover command message, receiving, by the UE, a stream of data packets from the target BS, each data packet of the stream of data packets including a quality of service flow identifier (QFI) and a reflective mapping indicator, the reflective mapping indicator of a data packet of the stream of data packets indicating that the user equipment uses the data packet for reflective mapping of a subsequent, uplink data packet. Operation 630 includes performing, by the UE, a mapping operation to map at least one data packet of the stream of data packets to a respective data radio bearer (DRB), the mapping operation being independent of a value of the respective reflective mapping indicator of the at least one data packet.

Example 8

According to an example implementation of example 7, wherein the method further comprises ceasing the mapping operation until a specified amount of time has elapsed.

Example 9

According to an example implementation of example 8, wherein the specified amount of time is signaled by the network.

Example 10

According to an example implementation of example 8, wherein the specified amount of time is signaled in the handover command message.

Example 11

According to an example implementation of example 8, wherein the specified amount of time is based on a data volume in transmission buffers.

Example 12

According to an example implementation of example 7, wherein the method further comprises ceasing the mapping operation until a threshold sequence number (SN) of buffered data packets has been reached.

Example 13

According to an example implementation of example 12, wherein the threshold SN is signaled from the network.

Example 14

According to an example implementation of example 7, wherein the data packet of the set of data packets further includes a quality of service flow indicator; and wherein the data packet is configured to be used by the user equipment for reflective mapping of the subsequent, uplink data packet based on the quality of service flow indicator of the data packet.

Example 15

Figure 7:
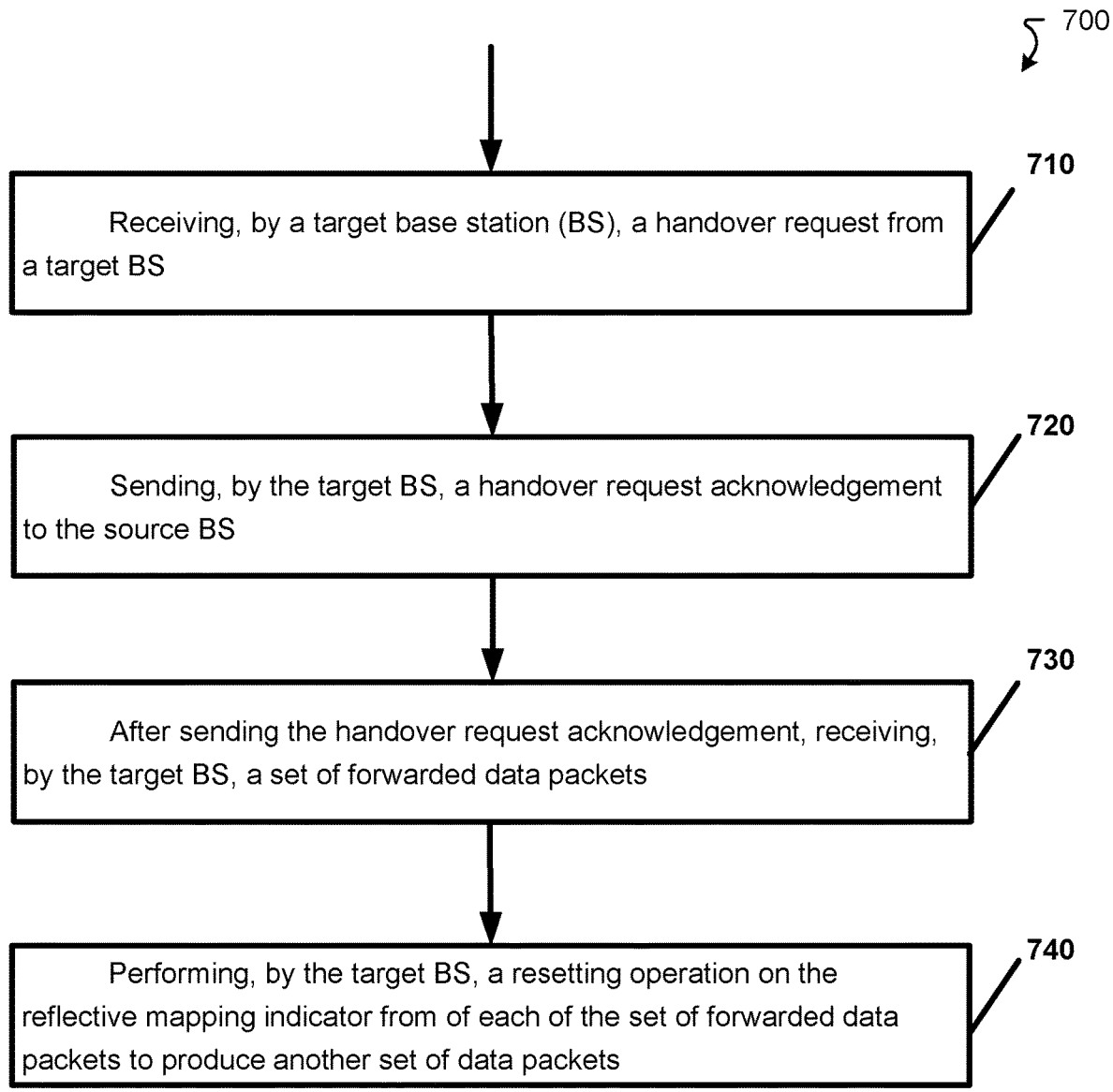
FIG. 7 is a flow chart illustrating operation of a target base station according to an example implementation.

FIG. 7 is a flow chart illustrating operation of a target base station (BS) according to an example implementation. Operation 710 includes receiving, by a target BS, a handover (HO) request from a source BS. Operation 720 includes sending, by the target BS, a handover request acknowledgement to the target BS. Operation 730 includes, after sending the HO request acknowledgement, receiving, by the source BS, a set of forwarded data packets to be forwarded to the target BS, each of the set of forwarded data packets including a reflective mapping indicator. Operation 740 includes performing, by the target BS, a resetting operation on the reflective mapping indicator of each of the set of data packets to produce another set of data packets.

Example 16

An apparatus comprising means for performing a method of any of examples 1-6.

Example 17

An apparatus comprising means for performing a method of any of examples 7-14.

Example 18

An apparatus comprising means for performing a method of claim 15.

Example 19

A computer program product including a non-transitory computer-readable storage medium and storing executable code that, when executed by at least one data processing apparatus, is configured to cause the at least one data processing apparatus to perform a method of any of claims 1-15.

Further example implementations and/or example details will now be provided.

List of Example Abbreviations

Figure 8:
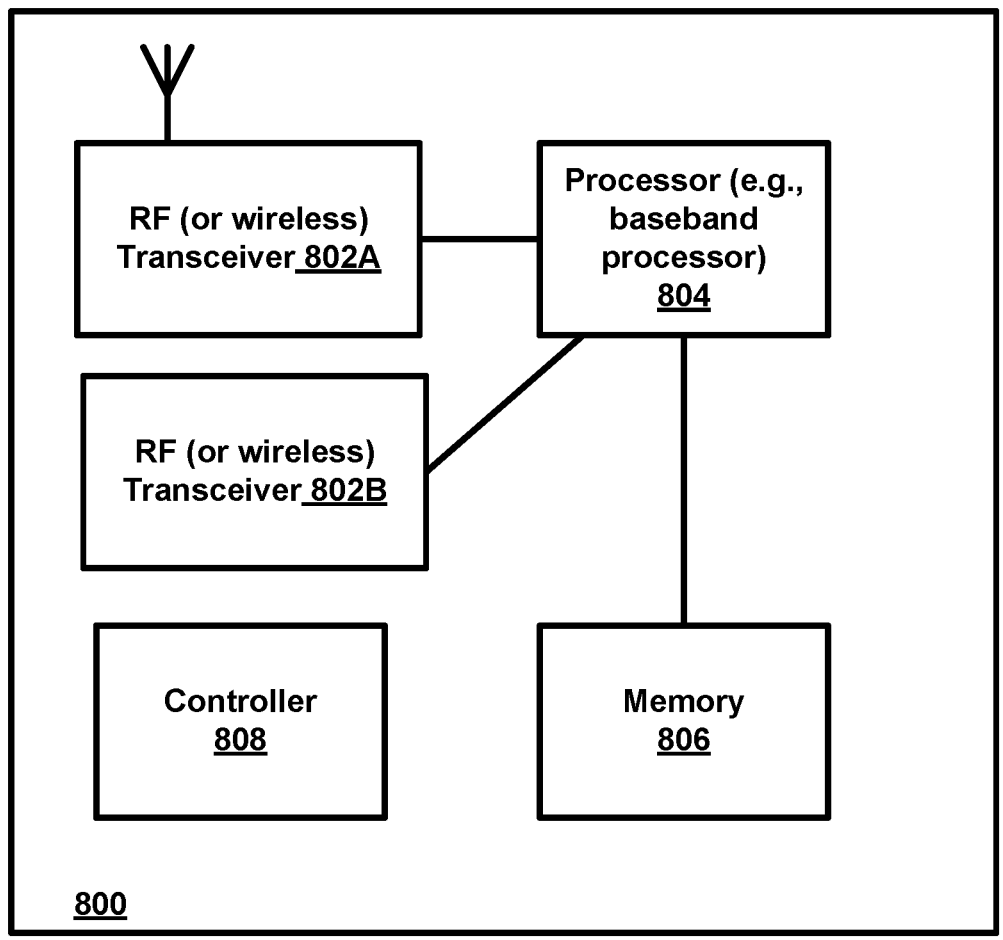
FIG. 8 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology 5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 8 is a block diagram of a wireless station (e.g., AP, BS, eNB, UE or user device) 800 according to an example implementation. The wireless station 800 may include, for example, one or two RF (radio frequency) or wireless transceivers 802A, 802B, where each wireless transceiver includes a transmitter to transmit signals and a receiver to receive signals. The wireless station also includes a processor or control unit/entity (controller) 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers Implementations may also be provided on a computer readable medium or computer readable storage medium, which may be a non-transitory medium Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed:

1. An apparatus, comprising:
   at least one processor; and
   at least one memory including computer program code;
   the at least one memory and the computer program code configured to, with the at least one processor, cause the apparatus at least to:
   receive a handover command message from a source base station, wherein the handover command message includes information concerning a target base station;
   after receiving the handover command message, receive a set of data packets from the source base station via the target base station, wherein the data packets of the set of data packets include respective reflective mapping indicators reset according to a resetting operation in response to receipt of a handover acknowledgment message at the source base station from the target base station, wherein the reflective mapping indicators of the data packets of the set of data packets indicate whether the apparatus uses the respective data packet to update a mapping rule, and wherein the resetting operation comprises resetting the reflective mapping indicators to indicate no updating of the mapping rule; and perform a mapping operation to map a subsequent uplink data packet to a data radio bearer according to the mapping rule.

2. The apparatus as in claim 1, wherein the data packet of the set of data packets further includes a quality of service flow indicator, when the data packets are to be used by the apparatus for reflective mapping of the subsequent uplink data packet based on the quality of service flow indicator of the data packet.

3. The apparatus as in claim 1, wherein data packets of the set of data packets include respective service data adaptation protocol headers; and wherein the respective reflective mapping indicator includes a respective reflective mapping indication bit in the respective service data adaptation protocol header.

4. The apparatus as in claim 1, wherein the mapping rule is a rule for mapping uplink data packets to data radio bearers.

5. The apparatus as in claim 4, wherein the mapping rule includes a mapping table.

6. A method, comprising:

receiving, by a user equipment, a handover command message from a source base station, wherein the handover command message includes information concerning a target base station;

after receiving the handover command message, receiving, by the user equipment, a set of data packets from the source base station via the target base station, wherein the data packets of the set of data packets include respective reflective mapping indicators reset according to a resetting operation in response to receipt of a handover acknowledgment message at the source base station from the target base station, wherein the reflective mapping indicators of the data packets of the set of data packets indicate whether the apparatus uses the respective data packet to update a mapping rule, and wherein the resetting operation comprises resetting the reflective mapping indicators to indicate no updating of the mapping rule; and performing, by the user equipment, a mapping operation to map a subsequent uplink data packet to a data radio bearer according to the mapping rule.

7. The method as in claim 6, wherein the data packet of the set of data packets further includes a quality of service flow indicator, when the data packets are to be used by the user equipment for reflective mapping of the subsequent uplink data packet based on the quality of service flow indicator of the data packet.

8. The method as in claim 6, wherein data packets of the set of data packets include respective service data adaptation protocol headers; and wherein the respective reflective mapping indicator includes a respective reflective mapping indication bit in the respective service data adaptation protocol header.

9. The method as in claim 6, wherein the mapping rule is a rule for mapping uplink data packets to data radio bearers.

10. The method as in claim 9, wherein the mapping rule includes a mapping table.

11. An apparatus, comprising:
at least one processor; and
at least one memory including computer program code;
the at least one memory and the computer program code configured to, with the at least one processor, cause the apparatus at least to:
send a handover request to a target base station;
receive a handover request acknowledgement from the target base station;
in response to receiving the handover request acknowledgement, identify a set of data packets to be subject to a resetting operation before forwarding to the target base station, wherein the data packets of the set of data packets include reflective mapping indicators, wherein the reflective mapping indicators indicate whether the respective data packet is to be used for updating a mapping rule;
prior to forwarding the set of data packets to the target base station, perform the resetting operation on the set of data packets, wherein the resetting operation comprises resetting the reflective mapping indicators to indicate no updating of a mapping rule.

12. The apparatus as in claim 11, wherein data packets of the set of data packets include respective service data adaptation protocol headers; and wherein the respective reflective mapping indicator includes a respective reflective mapping indication bit in the respective service data adaptation protocol header.

13. The apparatus as in claim 11, wherein the mapping rule is a rule for mapping uplink data packets to data radio bearers.

14. The apparatus as in claim 13, wherein the mapping rule includes a mapping table.

* * * * *